(12) United States Patent
Motoyanagi

(10) Patent No.: US 10,632,676 B2
(45) Date of Patent: Apr. 28, 2020

(54) HEATING APPARATUS, HEATING METHOD, THREE-DIMENSIONAL OBJECT FORMING SYSTEM, AND NON-TRANSITORY COMPUTER-READABLE STORAGE MEDIUM

(71) Applicant: CASIO COMPUTER CO., LTD., Shibuya-ku, Tokyo (JP)

(72) Inventor: Yoshimune Motoyanagi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 223 days.

(21) Appl. No.: 14/849,156

(22) Filed: Sep. 9, 2015

(65) Prior Publication Data

US 2016/0075083 A1    Mar. 17, 2016

(30) Foreign Application Priority Data

Sep. 17, 2014    (JP) .................................. 2014-189266

(51) Int. Cl.
*B29C 64/264*    (2017.01)
*B29C 44/34*    (2006.01)
(Continued)

(52) U.S. Cl.
CPC .......... *B29C 64/264* (2017.08); *B29C 44/353* (2013.01); *B29C 64/00* (2017.08);
(Continued)

(58) Field of Classification Search
CPC ........................... B29C 44/353; B29C 67/0051
See application file for complete search history.

(56) References Cited

U.S. PATENT DOCUMENTS 4,217,093 A * 8/1980 Steinlehner ........ G03G 15/2014
219/216
4,268,615 A * 5/1981 Yonezawa ................ B41M 3/16
101/401.1
(Continued)

FOREIGN PATENT DOCUMENTS

CN    102649365 A    8/2012
CN    103770472 A    5/2014
(Continued)

OTHER PUBLICATIONS

Radiant Heating With Infrared, A Technical Guide to Understanding and Applying Infrared Heaters, Watlow Electric Manufacturing Company (Year: 1997).*
(Continued)

*Primary Examiner* — Leith S Shafi
*Assistant Examiner* — Nicholas R Krasnow
(74) *Attorney, Agent, or Firm* — Holtz, Holtz & Volek PC

(57) ABSTRACT

A heating apparatus for emitting thermal energy, includes a heater which emits the thermal energy directed at a thermal expansion sheet that expands according to a heating amount absorbed, a relative mover which causes the heater and the thermal expansion sheet to move relatively in a predetermined direction, and a controller which changes one of a speed of the relative movement by the relative mover and a heat generation amount by the heater, according to the relative movement of the heater and the thermal expansion sheet, so that the heating amount received by the thermal expansion sheet is close to uniform regardless of the position in the predetermined direction while the thermal energy is emitted by the heater.

3 Claims, 10 Drawing Sheets

(51) Int. Cl.
*B29C 64/00* (2017.01)
*B29K 105/04* (2006.01)
*B29K 105/00* (2006.01)
*B33Y 10/00* (2015.01)
*B33Y 30/00* (2015.01)
*B33Y 50/02* (2015.01)

(52) U.S. Cl.
CPC .. *B29C 44/3415* (2013.01); *B29K 2105/0076* (2013.01); *B29K 2105/04* (2013.01); *B29K 2105/256* (2013.01); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 4,672,172 A * | 6/1987 | Pearl | B23K 26/0846 | 219/121.67 |
| 4,698,504 A * | 10/1987 | Van Pelt | B41F 22/00 | 118/324 |
| 4,792,246 A * | 12/1988 | Van Pelt | B41F 23/065 | 219/216 |
| 4,871,408 A * | 10/1989 | Honma | B41M 3/16 | 156/83 |
| 5,634,167 A * | 5/1997 | Islam | G03D 13/002 | 396/579 |
| 5,874,982 A * | 2/1999 | Ueda | B41J 2/365 | 347/194 |
| 5,910,260 A * | 6/1999 | Gerber | B23K 26/082 | 219/121.67 |
| 6,121,984 A * | 9/2000 | Anderson | G02B 26/0841 | 347/135 |
| 6,342,115 B1 * | 1/2002 | Pourmand | B30B 5/06 | 100/308 |
| 6,453,219 B1 * | 9/2002 | Kazmierowicz | G05B 13/024 | 700/207 |
| 8,870,327 B2 | 10/2014 | Kanamura et al. | | |
| 2004/0105693 A1 * | 6/2004 | Akizuki | G03G 15/2039 | 399/69 |
| 2004/0189784 A1 * | 9/2004 | Mogi | B41J 2/355 | 347/218 |
| 2006/0096480 A1 * | 5/2006 | Hanosek | F27B 9/063 | 101/416.1 |
| 2008/0017786 A1 * | 1/2008 | Shih | G01S 17/026 | 250/221 |
| 2012/0218338 A1 * | 8/2012 | Kanamura | B41J 3/407 | 347/15 |
| 2012/0270171 A1 * | 10/2012 | Ajmera | A21B 1/50 | 432/148 |
| 2014/0110887 A1 | 4/2014 | Horiuchi | | |
| 2014/0225154 A1 * | 8/2014 | Daigo | C30B 23/02 | 257/103 |
| 2016/0052298 A1 * | 2/2016 | Allen | B41M 7/0081 | 347/102 |
| 2017/0368850 A1 * | 12/2017 | Eveilleau | B41J 11/0085 | |

FOREIGN PATENT DOCUMENTS

| | | | | |
|---|---|---|---|---|
| JP | 52150472 A | | 12/1977 |
| JP | 08258313 A | | 10/1996 |
| JP | 2000039798 A | | 2/2000 |
| JP | 2001088423 A | | 4/2001 |
| JP | 2001150812 A | * | 6/2001 |
| JP | 2001150812 A | | 6/2001 |
| JP | 5007113 B2 | | 8/2012 |
| JP | 5212504 B2 | | 6/2013 |

OTHER PUBLICATIONS

Chinese Office Action (and English translation thereof) dated Sep. 21, 2016, issued in counterpart Chinese Application No. 201510594349.7.

Japanese Office Action (and English translation thereof) dated Aug. 23, 2016, issued in counterpart Japanese Application No. 2014-189266.

Chinese Office Action dated Sep. 16, 2019 (and English translation thereof) issued in Chinese Application No. 201810237550.3.

* cited by examiner

FIG. 7
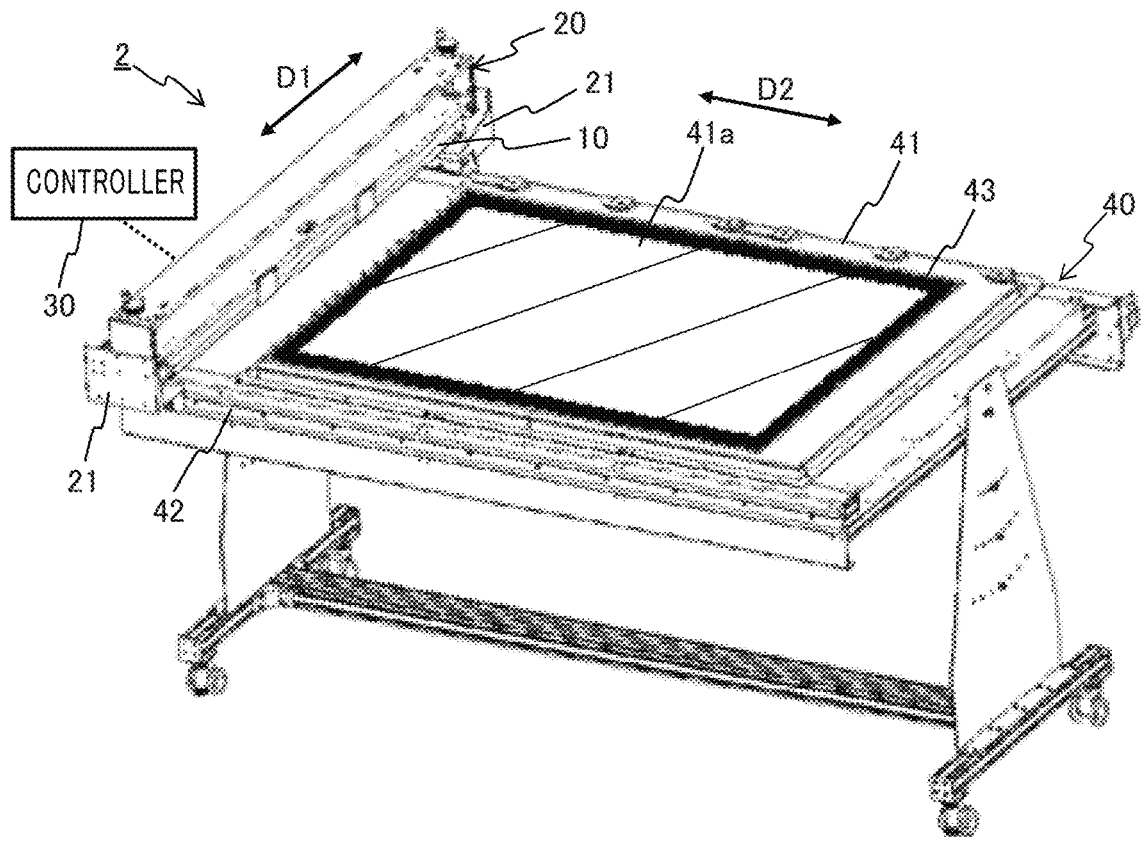
FIG. 8
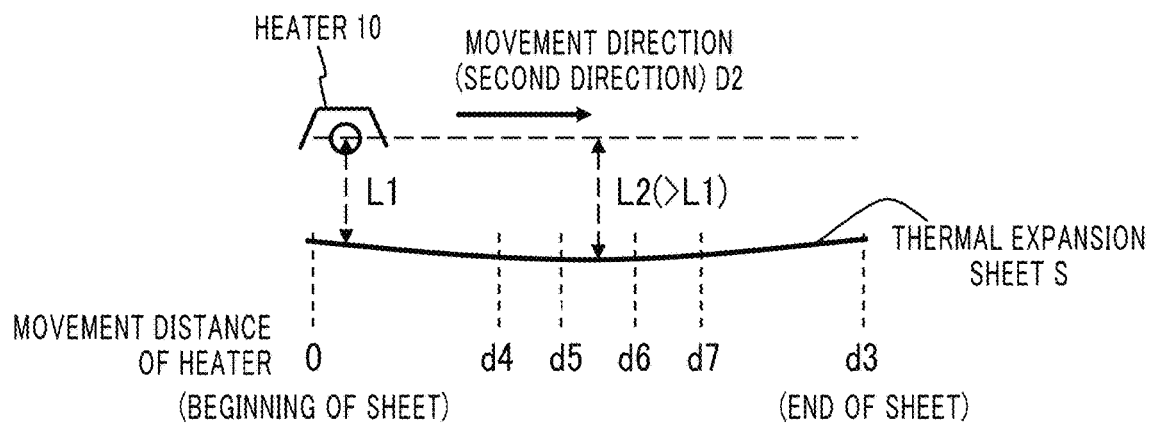
FIG. 9
| MOVEMENT DISTANCE d | 0≦d<d4 | d4≦d<d5 | d5≦d<d6 | d6≦d<d7 | d7≦d<d3 |
|---|---|---|---|---|---|
| SPEED CORRECTION VALUE V2 | 0 | V3 | V4 | V3 | 0 |

US 10,632,676 B2

HEATING APPARATUS, HEATING METHOD, THREE-DIMENSIONAL OBJECT FORMING SYSTEM, AND NON-TRANSITORY COMPUTER-READABLE STORAGE MEDIUM

CROSS-REFERENCE TO RELATED APPLICATION

This application claims the benefit of Japanese Patent Application No. 2014-189266, filed on Sep. 17, 2014, the entire disclosure of which is incorporated by reference herein.

FIELD

The present disclosure relates to a heating apparatus, a heating method, a three-dimensional object forming system, and a non-transitory computer-readable storage medium.

BACKGROUND

Three-dimensional printing apparatuses that utilize a thermal expansion sheet to form three-dimensional shapes are conventionally known. Among such three-dimensional printing apparatuses, a three-dimensional printing apparatus is known in which a selectively designated section of a color image is cut out and this section is converted into a binary image or a grayscale image and printed onto the surface of the thermal expansion sheet and the radiant heat applied causes printed sections of the binary image or the grayscale image to foam expand and rise (See Japanese Patent No. 5,212,504, for example).

Note that the three-dimensional printing apparatus foam expands the printed sections of the binary image or the grayscale image causing the printed sections to rise, then forms white ink along the entire surface of the thermal expansion sheet, and finally prints an original color image.

SUMMARY

However, with three-dimensional printing apparatuses that form three-dimensional shapes by heating and foam expanding thermal expansion sheets as described above, in a case in which the heater of the lamp unit and the like gradually accumulates heat even when control is performed to keep the heat generation amount per unit time of the heater at a constant level, since the heating amount received per unit time by the unit area of the thermal expansion sheet ends up increasing, ultimately, the degree of foam expansion increases according to the state of the heat accumulation even if the concentration level of black of the binary image or the grayscale image is the same portion.

For example, a case is considered in which a thermal expansion sheet to which ink containing thermal expansion microcapsules is applied is heated by a lamp unit which is moved relative to the thermal expansion sheet from one end to the other end thereof. In this case, the greater the concentration level of black of the portion, the greater the height of the foam is, but, as illustrated in FIG. 16, in the case of heating the thermal expansion sheet, the foaming height of the end portion is greater than that of the front portion due to heat accumulation by the lamp unit. Note that heat accumulation is not limited to the heater of the lamp unit and the like, but may also occur in the thermal expansion sheet or the mounting table on which the thermal expansion sheet is mounted on.

SUMMARY

A heating apparatus according to the present disclosure is an apparatus for emitting thermal energy, including:
  a heater which emits the thermal energy directed at a thermal expansion sheet that expands according to a heating amount absorbed;
  a relative mover which causes the heater and the thermal expansion sheet to move relatively in a predetermined direction; and
  a controller which changes one of a speed of the relative movement by the relative mover and a heat generation amount by the heater, according to the relative movement of the heater and the thermal expansion sheet, so that the heating amount received by the thermal expansion sheet is close to uniform regardless of the position in the predetermined direction while the thermal energy is emitted by the heater.

A three-dimensional object forming system according to the present disclosure includes:
  a photothermal conversion material forming apparatus that forms a photothermal conversion material in a to-be-expanded area of a thermal expansion sheet that expands according to a heating amount absorbed; and
  a heating apparatus including:
    a heater which emits thermal energy;
    a relative mover which causes the heater and the thermal expansion sheet to move relatively in a predetermined direction; and
    a controller which changes one of a speed of the relative movement by the relative mover and a heat generation amount by the heater, according to the relative movement of the heater and the thermal expansion sheet, so that the heating amount received by the thermal expansion sheet is close to uniform regardless of the position in the predetermined direction while the thermal energy is emitted by the heater.

A heating method according to the present disclosure is a method for emitting thermal energy, including:
  moving relatively a heater that emits the thermal energy directed at a thermal expansion sheet that expands according to a heating amount absorbed and the thermal expansion sheet; and
  changing one of a speed of the relative movement and a heat generation amount by the heater, according to the relative movement of the heater and the thermal expansion sheet, so that the heating amount received by the thermal expansion sheet is close to uniform regardless of the position in the predetermined direction while the thermal energy is emitted by the heater during the relative movement.

A non-transitory computer-readable storage medium according to the present disclosure is a medium having stored thereon a program executable by a computer, the program controlling the computer to perform functions including:
  moving relatively a heater that emits thermal energy directed at a thermal expansion sheet that expands according to a heating amount absorbed and the thermal expansion sheet; and
  changing one of a speed of the relative movement and a heat generation amount by the heater, according to the relative movement of the heater and the thermal expansion sheet, so that the heating amount received by the thermal expansion sheet is close to uniform regardless of the position in the predetermined direction while the thermal energy is emitted by the heater during the relative movement.

BRIEF DESCRIPTION OF THE DRAWINGS

A more complete understanding of this application can be obtained when the following detailed description is considered in conjunction with the following drawings, in which:

FIG. 7 is a perspective view illustrating the heating apparatus with the thermal expansion sheet removed from the heating apparatus in Embodiment 2 of the present disclosure;

FIG. 8 is an explanatory diagram showing the bending of the thermal expansion sheet;

FIG. 9 is a table showing an example of speed correction values in Embodiment 2 of the present disclosure;

DETAILED DESCRIPTION

The heating apparatus, heating method and three-dimensional object forming system set forth in the Embodiments of the present disclosure are described hereinafter with reference to the drawings.

Embodiment 1

Figure 1:
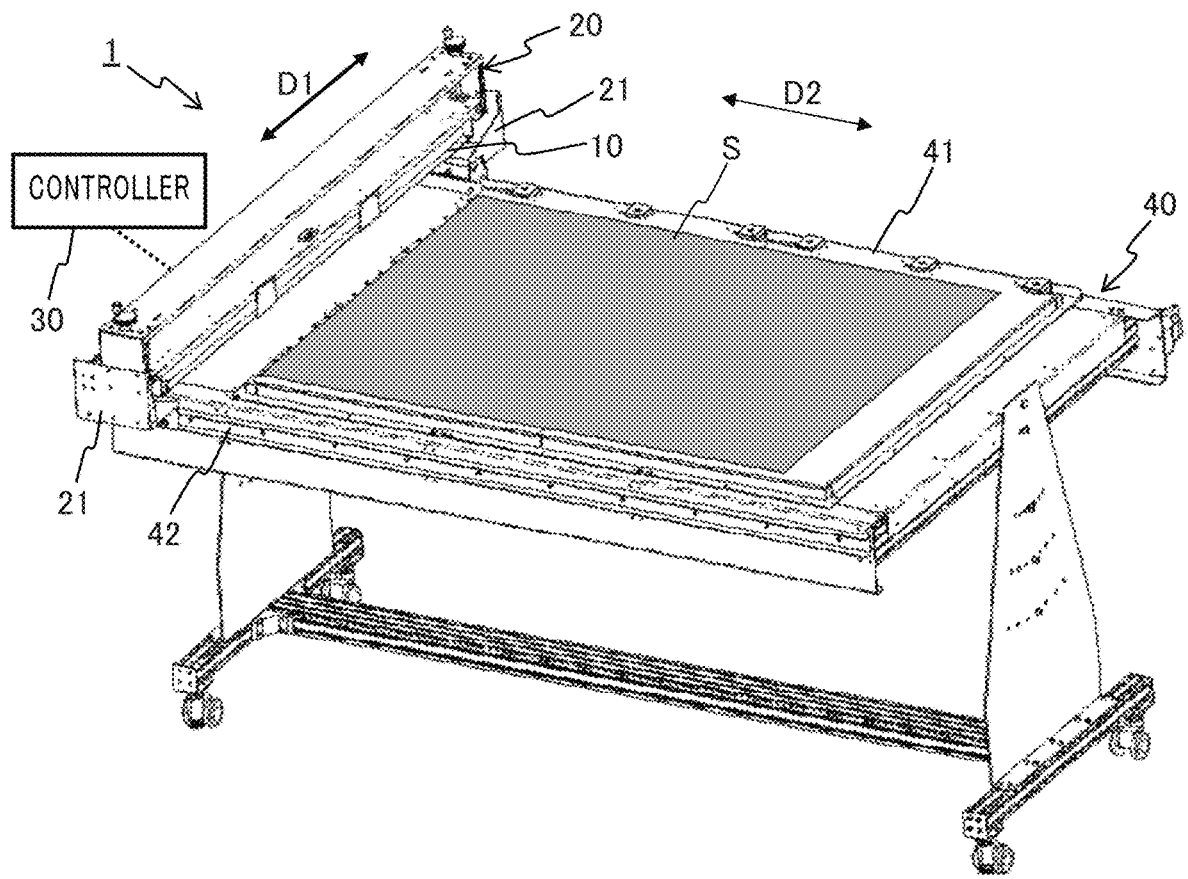
FIG. 1 is a perspective view illustrating a heating apparatus set forth in Embodiment 1 of the present disclosure.

FIG. 1 is a perspective view illustrating a heating apparatus 1 set forth in Embodiment 1 of the present disclosure.

A heating apparatus 1 illustrated in FIG. 1 includes a heater 10, a mover 20 which is an example of a relative mover, a controller 30, and a base 40. Although described in detail below, the heating apparatus 1 heats a thermal expansion sheet S thereby causing foam expansion so as to form a three-dimensional shape.

The heater 10, for example, includes a halogen lamp and reflector mirror positioned above the halogen lamp. Also, the heater 10 is positioned above the thermal expansion sheet S that is mounted on a mounting table 41 which includes a base 40.

The top surface of the mounting table 41 and the thermal expansion sheet S both present a rectangular shape and the thermal expansion sheet S is mounted on the top surface of the mounting table 41 so that the both long sides and the both short sides are respectively parallel to each other. For example, when the long side of the thermal expansion sheet S is sufficiently shorter than the short side of the top surface of the mounting table 41, the thermal expansion sheet S may be positioned so that the long side thereof is parallel with the short side of the top surface of the mounting table 41 however it is preferable that at least one of the sides is parallel with another side.

The heater 10 is provided in such a way as to be relatively movable with respect to the mounting table 41 and the thermal expansion sheet S. The heater 10 is presented as having an elongated shape and is positioned so as to be parallel with each short side of the mounting table 41 and the thermal expansion sheet S and is configured so as to be relatively movable with respect to the mounting table 41 and the thermal expansion sheet S in the direction intersecting the long axis of the heater 10, that is to say, the direction parallel with each long side of the mounting table 41 and the thermal expansion sheet S, while kept in a parallel state. In the present disclosure, the long axis direction of the heater 10 and the short side direction (widthwise direction) of the mounting table 41 and the thermal expansion sheet S are referred to as the first direction (arrow D1, the direction intersecting the predetermined direction), and the movement direction of the heater 10 and long side direction of the mounting table 41 and the thermal heat expansion sheet S is referred to as the second direction (arrow D2, the predetermined direction).

Also, the heater 10, having a length along the first direction that is longer than the short side (width) of the heat expansion sheet S, is positioned so as to cover the entire short side of the thermal expansion sheet S along the first direction, and applies thermal energy (for example, heat radiation rays) to the thermal expansion sheet S along the entire first direction (the range longer than the length of the thermal expansion sheet S along the first direction). Furthermore, the heater 10 heats the entire surface of the thermal expansion sheet S by moving together with the mover 20, mentioned previously, in the second direction.

Figure 2A:
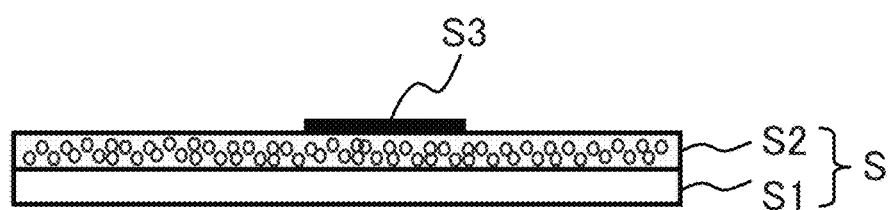
FIGS. 2A and 2B are explanatory diagrams showing foam expansion of a thermal expansion sheet.
Figure 2B:
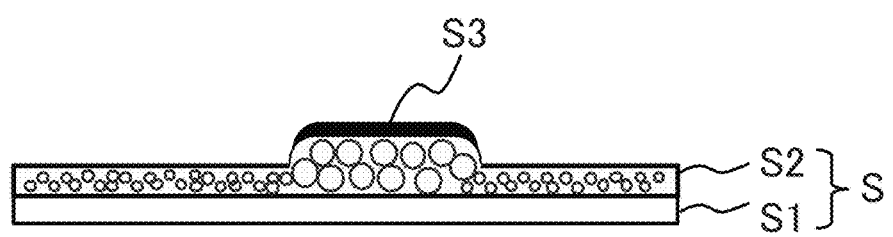

FIGS. 2A and 2B are explanatory diagrams showing foam expansion of a thermal expansion sheet S.

As illustrated in FIG. 2A, the thermal expansion sheet S is made up of a base material S1, and a foaming resin layer S2 provided above the base material S1, in which a thermal foaming agent (thermal expansion microcapsules) is distributively arranged in binder which is thermoplastic resin. The base S1 is not particularly limited in the type of substance used, and may be composed of paper, cloth such as canvas cloth, and/or the like, or panel material such as plastic and/or the like. For these types, a commonly known product available on the market can be used as the thermal expansion sheet S.

A grayscale image (absorbing portion) S3 is printed on the face of the foaming resin layer S2 of the thermal expansion sheet S (top surface in FIGS. 2A and 2B) with black ink from photothermal conversion material. The black ink, for example, includes photothermal conversion material that absorbs light energy from infrared rays, extreme infrared rays and the like from carbon black and the like which is converted into thermal energy. The printing image is not limited to the grayscale image S3 and may be a binary image but for simplicity sake, only the grayscale image S3 is shown in the present embodiment. Also, when the heating amount received per unit time by the unit area of the thermal expansion sheet S is constant throughout the heating of the thermal expansion sheet S by the heater 10, of the foaming resin layer S2, the portion on which the grayscale image S3 is printed in black ink on the face thereof (foaming portion) absorbs a greater heating amount than the portion on which the grayscale image S3 in black ink is not printed (non-foaming portion). Therefore, foaming resin layer S2 of the portion on which the grayscale image S3 is formed on the thermal expansion sheet S greatly (highly) expands, more so than the non-formed portion. Also, the foaming resin layer S2 for the portion on which the grayscale image S3 is formed with a high concentration level on the thermal expansion sheet S greatly (highly) expands, more so than the portion formed with a low concentration level. This grayscale image S3, for example, is generated based on a raw image. The grayscale image S3 can be generated when forming a three-dimensional object that corresponds to the raw image, by setting a high concentration level for the portion that ought to be relatively highly formed, and by setting a low concentration level for the portion that ought to be relatively lowly formed. Note that the degree of correlation or the existence of a correlation between the concentration level set for this grayscale image S3 and the raw image is not considered.

The thermal expansion sheet S is oriented so that the surface on which the grayscale image S3 is printed in black ink faces up, and then is mounted and fixed to the mounting table 41 illustrated in FIG. 1.

When the heater 10 emits thermal energy directed at the thermal expansion sheet S, the grayscale image S3 in black ink absorbs the heating amount converted from, for example, the heat radiation rays of the heater 10, thereby transmitting the heat to the thermal foaming agent contained in the foaming resin layer S2 to cause a thermal-expansion reaction in the thermal foaming agent. Thus, as illustrated in FIG. 2B, the foaming portion of the thermal expansion sheet S expands and rises. Here, since the foaming height of the foaming resin layer S2 has a positive correlation to the heating amount absorbed by the foaming resin layer S2, when the heating amount received per unit time by the unit area of the thermal expansion sheet S is constant, the height of the foaming portion on the foaming resin layer S2 rises higher than the height of the non-foaming portion. Also, even when the non-foaming portion absorbs heat radiation rays, the heating amount is sufficiently keep to a minimum, meaning that the height of the non-foaming portion of the foaming resin layer S2 either substantially does not change or the height change is sufficiently small in comparison with the foaming portion.

In this way, the printed surface of the thermal expansion sheet S heated by the heater 10 becomes three-dimensional due to the considerable foaming of foaming agent of the portion on which the grayscale image S3 printed in black ink by the difference in the absorption rate between the portion printed with in black ink and the non-printed portion, and due to the thermal expansion sheet S becoming thicker in the direction orthogonal to the surface thereof.

Referring back to FIG. 1, the mover 20 causes the heater 10 and thermal expansion sheet S to move relatively in the second direction intersecting the first direction (relative movement step). In Embodiment 1 of the present disclosure, the mover 20 is arranged to be movable relatively with respect to the mounting table 41 and since the heater 10 is fixed to the mover 20, the mover 20 is configured to move only the heater 10 of the heater 10 and the thermal expansion sheet S.

The mover 20, for example, includes a drive motor which is a stepper motor, not shown. This drive motor is controlled by the controller 30. Also, the mover 20 has a slider 21 on the lower portion of both ends thereon in the first direction. This slider 21 moves in the second direction along a pair of guide rails 42 arranged on the base 40.

Note that the second direction may be a direction that intersects the first direction but in Embodiment 1 of the present disclosure, is orthogonal to the first direction. Also, in Embodiment 1 of the present disclosure, the first direction and the second direction are both horizontal directions.

The base 40 includes the mounting table 41 and the pair of guide rails 42. As described above, the thermal expansion sheet S is mounted on the mounting table 41. Also, the slider 21 of the mover 20 moves in the second direction along the pair of guide rails 42.

The controller 30 performs control to change the movement speed of the heater 10 moved by the mover 20 according to the position in the second direction of the heater 10 so that the heating amount received per unit time by the unit area of the thermal expansion sheet S is close to uniform regardless of the position in the second direction (control step). Note that instead of changing the movement speed of the heater 10, the controller 30 may perform control (for example, pulse width modulation (PWM)) so as to change the heat generation amount by the heater 10 or perform control so as to change both the movement speed and the heat generation amount.

Figure 3:
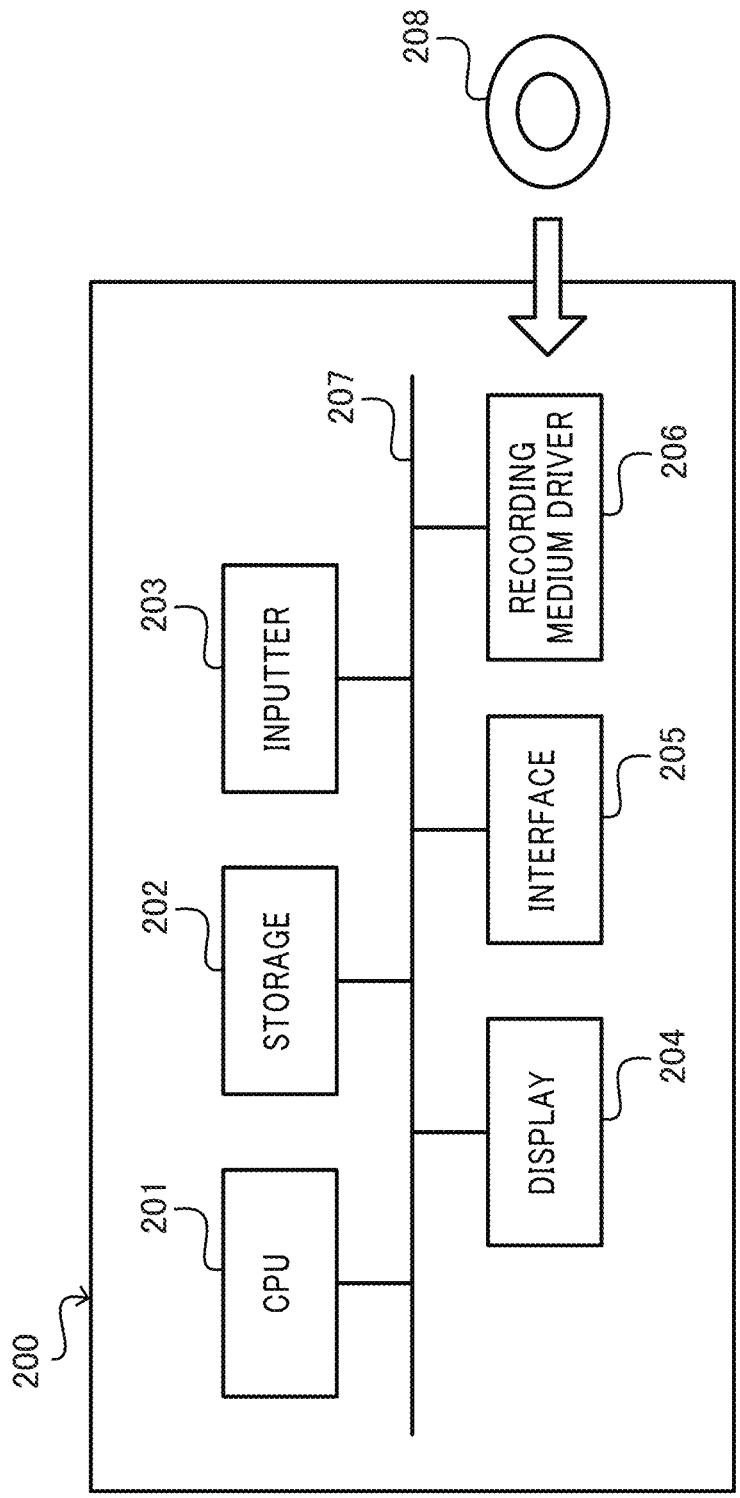
FIG. 3 is a structural example of computer hardware that operates as a controller in Embodiment 1 of the present disclosure.

FIG. 3 is a structural example of a computer hardware 200 that can operate as a controller 30 in Embodiment 1 of the present disclosure.

The computer 200 illustrated in FIG. 3 includes a central processing unit (CPU) 201, a storage 202, an inputter 203, a display 204, an interface 205, and a recording medium driver 206. These structural elements are connected via a bus line 207 and can exchange various types of data with each other.

A CPU 201 is an arithmetic processing device that controls the entirety of the operation of the computer 200. The CPU 201 performs the various types of processing in the heating apparatus 1 by reading and executing the control program for the heating apparatus 1.

The storage 202 is made up of read-only memory (ROM), random access memory (RAM), a hard disk, and the like.

The ROM is a read-only semiconductor memory in which a predetermined basic control program is recorded in advance. Also, a non-volatile memory, which does not lose stored data even when a power supply has halted, such as a flash memory and the like, may be used as the ROM.

The RAM is a semiconductor memory that can be written and read as necessary and used as a working memory area on an as-needed basis when the CPU 201 executes various types of control programs.

The hard disk stores various types of control programs executed by the CPU 201 and various types of data.

The inputter 203 is, for example, a keyboard device or a mouse device, and when manipulated by a user of the computer 200, the inputter 203 obtains inputs of various pieces of information from the user that are associated with the manipulations, and transmits the obtained input information to the CPU 201.

The display 204, for example, is a display and displays various texts or images.

The interface 205 manages the exchanges of various types of data between various types of apparatuses.

The recording medium driver 206 is a device that reads various types of control programs and data recorded in a portable recording medium 208. The CPU 201 can also read a predetermined control program recorded in the portable recording medium 208 and execute the control program via the recording medium driver 206 so as to perform various types of processes of the heating apparatus 1.

Note that examples of the portable recording medium 208 include a compact disc read-only memory (CD-ROM), a digital versatile disc read-only memory (DVD-ROM), a flash memory with a universal serial bus (USB) compatible connector, and the like.

Figure 4:
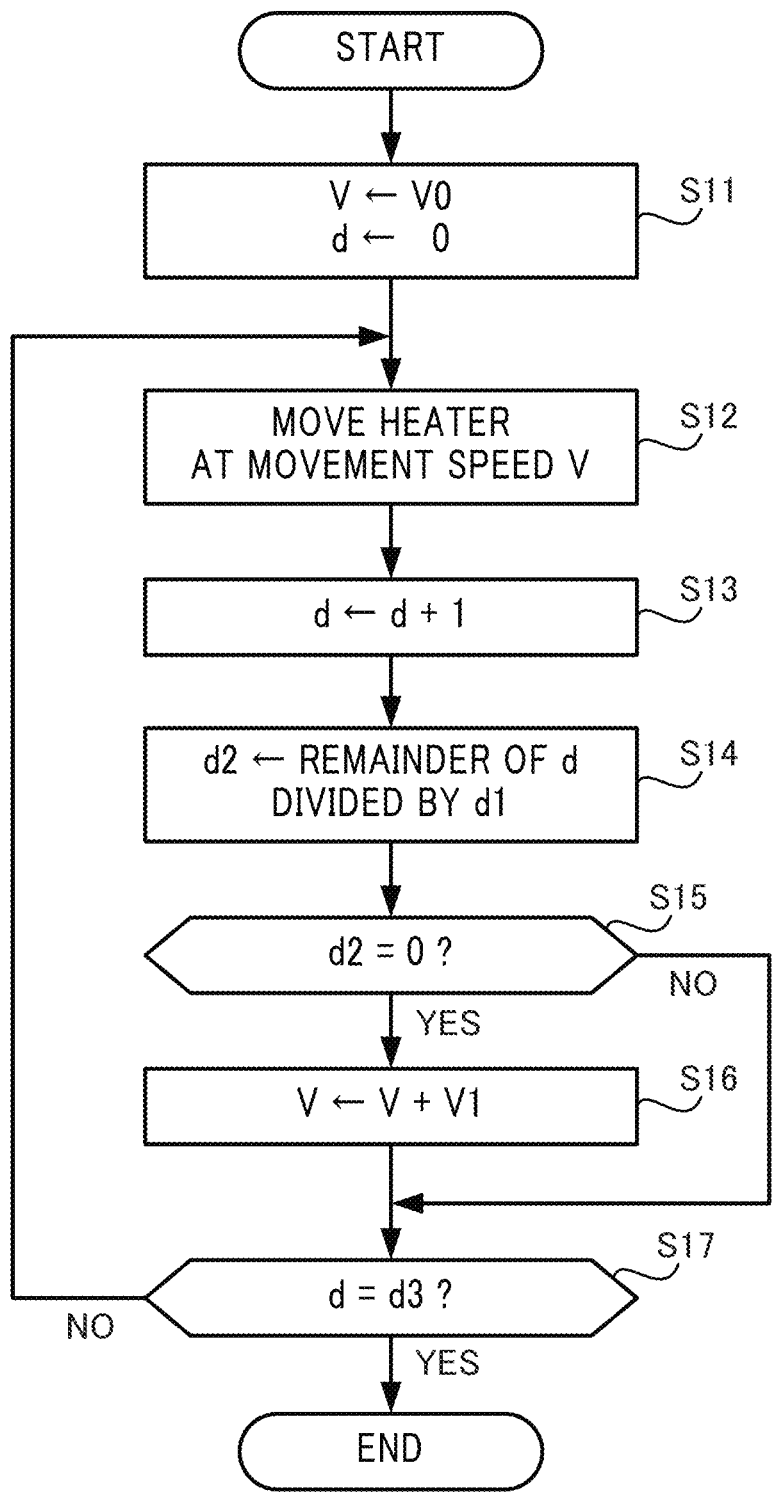
FIG. 4 is a flowchart that shows a control process for movement speed of a heater in Embodiment 1 of the present disclosure.

In order to make the computer 200 as described operate as the controller 30, firstly, a control program is generated that makes the CPU 201 execute the various types of processes as illustrated in FIG. 4, which is described below. The generated control program is stored in advance on the hard disk device of the storage 202 or the portable recording medium 208. Next, a predetermined instruction is given to the CPU 201 so as to make the CPU 201 read and execute the control program. Accordingly, the computer 200 functions as the controller 30.

FIG. 4 is a flowchart that shows a control process for movement speed of the heater 10 in Embodiment 1 of the present disclosure.

The controller 30 illustrated in FIG. 1, described in detail below, performs the various types of processes illustrated in FIG. 4 for performing control so as to gradually increase the movement speed of the heater 10 as time progresses. In other words, control is performed to gradually increase the movement speed of the heater 10 as the position of the heater 10 in the second direction moves from the starting point side closer to the ending point side.

In one example, in the various types of processing illustrated in FIG. 4, the initial speed V0 is 18.3 [mm/s], the distance at which the movement speed changes (predetermined distance) d1 is 1 [mm], and the change amount in the movement speed (predetermined amount) V1 is 0.001 [mm/s].

First, the controller 30 sets the initial value of movement speed V of the heater 10 to the movement speed V0 and sets the counter d of the movement distance to 0 (step S11).

Next, the controller 30 causes the heater 10 fixed to the mover 20 to move together with the mover 20 at the movement speed V by controlling the drive motor, not shown, of the mover 20 (step S12).

Also, the controller 30 increments the counter d by d+1 (step S13). Note that counter d represents, for example, a step of the stepper motor. Also, the increment of counter d corresponds with a single step of the stepper motor.

Then, when the controller 30 changes the distance at which the movement speed of the heater 10 changes (Embodiment 1 of the present disclosure: speeds up) to d1, the controller 30 sets d2 to the remainder found by dividing counter d by d1 (step S14).

Then, if the d2 is 0 (step S15; YES), in other words, if the heater 10 has advanced distance d1, the controller 30 adds V1 to the movement speed V of the heater 10 (step S16). Note that V1 is the change amount in the movement speed of the heater 10.

Next, if counter d reaches d3 which represents the end line of the thermal expansion sheet S (step S17; YES), the controller 30 stops processing, and if the counter d has not reached the end line (step S17; NO), processing returns to step S12.

Note that in step S15 described above, if d2 is not 0 (step S15; NO), processing proceeds to the above-mentioned step S17 without the controller 30 changing the movement speed (step S16).

Figure 5:
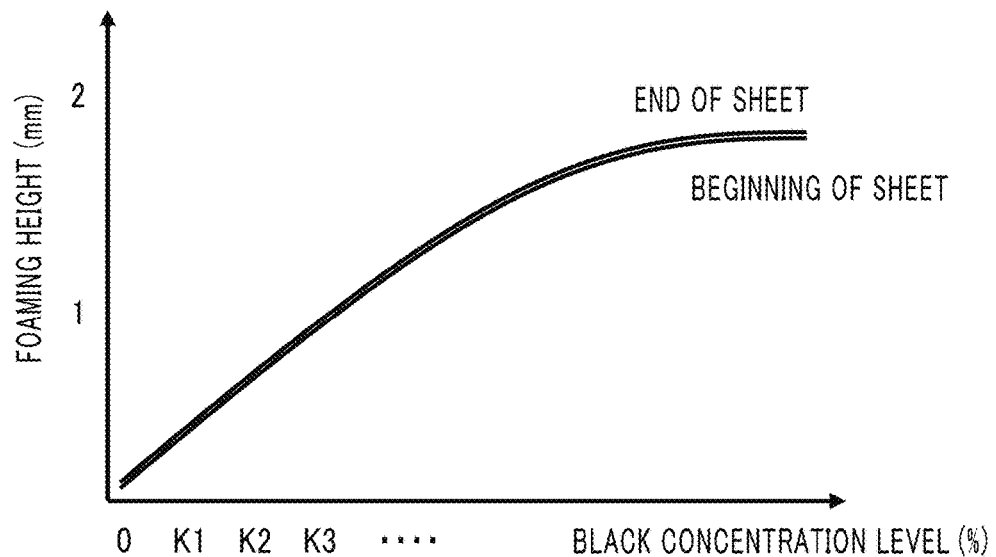
FIG. 5 is a graph illustrating the foaming height of the thermal expansion sheet in Embodiment 1 of the present disclosure.

When the controller 30 is performing controlling so as to keep the heat generation amount of the heater 10 constant due to the various kinds of processing as illustrated in FIG. 4, even if the heater 10 or the thermal expansion sheet S and mounting table 41, and/or the like accumulates heat, as long as the black concentration level of the grayscale image in black ink of the foaming portion is the same, control can be performed to keep the foaming height of the foaming portion substantially uniform regardless of the position in the second direction. As described above, the controller 30 increases the speed of the relative movement by a predetermined amount each time the heater 10 and the thermal expansion sheet S are moved relatively a predetermined distance in a predetermined direction. The experimental results in FIG. 5 illustrate that the foaming height of the forming portion on starting point side and the ending point side of the thermal expansion sheet S is uniform in each of the black concentration level areas in the grayscale image.

Note that in Embodiment 1 of the present disclosure, even though the change amount in the movement speed V1 of the heater 10 and the distance d1 are constant (shown in step S16 of FIG. 4), the change amount can be appropriately adjusted to conform to the heat accumulation conditions of the heater 10.

Also, in Embodiment 1 of the present disclosure, although the movement speed is intermittently changed each time the heater 10 advances the distance d1, the movement speed may be continuously changed according to the elapsed time of the thermal energy emission directed at the thermal expansion sheet S by the heater 10. For example, in Embodiment 1, since the initial speed V0 is 18.3 [mm/s], the time required to move the heater 10 just 1 [mm] of the movement speed change distance d1, is 1/18.3=0.0546 [s]. Also, since the change amount in the movement speed V1 is 0.001 [mm's], by calculating 0.001/0.0546, the acceleration becomes 0.0183 [mm/s2]. Accordingly, the movement speed becomes V=18.3+0.0183t [mm/s]. Note that t stands for the time elapsed whereas the unit is in seconds. Thus, the controller 30 gradually increases the speed of the relative movement according to the elapsed time of the thermal energy emission directed at the thermal expansion sheet S by the heater 10. Also, the controller 30 increases the speed of the relative movement on a linear function basis by the predetermined amount according to the elapsed time of the thermal energy emission directed at the thermal expansion sheet S by the heater 10.

As described above in Embodiment 1 of the present disclosure, the heating apparatus 1 emits thermal energy directed at the thermal expansion sheet S which foams expands according to the heating amount absorbed. Also, the heating apparatus 1 includes the heater 10, the mover 20 which is one example of a relative mover, and the controller 30. The heater 10 emits thermal energy across an area longer than the length of the thermal expansion sheet S along the first direction. The mover 20 causes the heater 10 to move thereby causing the heater 10 and the thermal expansion sheet S to relatively move in the second direction intersecting the first direction. While thermal energy is directed at the thermal expansion sheet S by the heater 10, in comparison with when control is performed so as to keep the speed of the relative movement at a constant level and the thermal amount of the heater 10 at a constant level, the controller 30 performs control so as to cause at least one of the speed of the relative movement by the mover 20 and the thermal amount by the heater 10 to be changed according to the position in the second direction, so that the heating amount received by the thermal expansion sheet S is close to uniform regardless of the position in the second direction.

In the past, the heating amount received per unit time by the unit area of the thermal expansion sheet S increases as the position of the heater 10 in the second direction moves from the starting point side closer to the ending point side due to the heat accumulation by the heater 10, or the thermal expansion sheet S, the mounting table 41 and/or the like even when control is performed to keep the heat generation amount per unit time of the heater 10 at a constant level. As a result, even if the black concentration level of the grayscale image in black ink of the foaming portion is the same, traditionally, there were cases in which the foaming height of the foaming portion was higher in the area corresponding to the starting point side than the area corresponding to the ending point side of the thermal expansion sheet S. According to Embodiment 1 of the present disclosure, while thermal energy is directed at the thermal expansion sheet S by the heater 10, in comparison with when control is performed so as to keep the speed of the relative movement between the heater 10 and the thermal expansion sheet S at a constant level and the thermal amount of the heater 10 at a constant level, the heating amount received by the thermal expansion sheet S can be controlled so as to keep the received heating amount substantially uniform regardless of the position in the second direction. As a result, for example, as long as the black concentration level of the grayscale image in black ink of the foaming portion is the same, control can be performed to keep the foaming height of the foaming portion substantially uniform regardless of the position in the second direction. Moreover, the three-dimensional shape formed by heating the thermal expansion sheet S and causing foam expansion, can be formed with a high degree of accuracy.

Also, in Embodiment 1 of the present disclosure, the controller 30 controls the relative movement speed between the heater 10 and the thermal expansion sheet S by the mover 20. Therefore, a three-dimensional shape can be formed with a high degree of accuracy by control that is simpler than controlling the heat generation amount of the heater 10.

Also, in Embodiment 1 of the present disclosure, the controller 30 performs control to make adjustments so as to gradually increase the movement speed (relative movement speed) of the heater 10 in the second direction as time progresses. Naturally, the controller 30 may perform control to make adjustments so as to gradually decrease the emitted heat energy directed at the thermal expansion sheet S from the heater 10 as time progress by gradually decreasing the thermal amount of the heater 10 as time progresses according to either the position in the second direction or the elapsed time of the thermal energy emission directed at the thermal expansion sheet S by the heater 10. Note that the control of this heating amount can be performed in lieu of controlling the movement speed of the heater 10, or can be performed while controlling the movement speed of the heater 10. Even in such cases, by controlling the heating amount received by the thermal expansion sheet S so as to keep the received heating amount substantially uniform regardless of the position in the second direction, as long as the black concentration level of the grayscale image in black ink of the foaming portion is the same, even if the heater 10, or the thermal expansion sheet S, the mounting table 41 and/or the like gradually accumulate heat, control can be performed to keep the foaming height of the foaming portion substantially uniform regardless of the position in the second direction.

Embodiment 2

Figure 6:
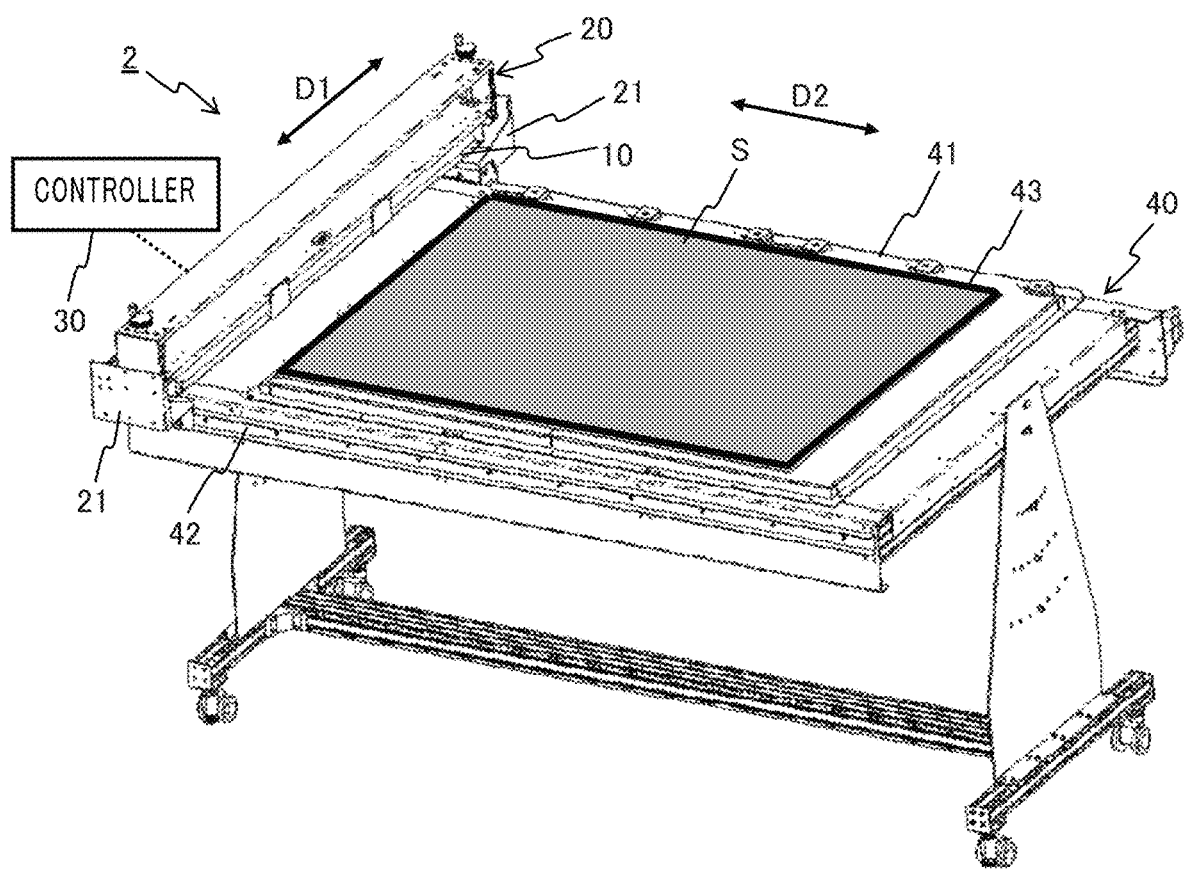
FIG. 6 is a perspective view illustrating a heating apparatus with a sheet holding plate and a thermal expansion sheet positioned thereon in Embodiment 2 of the present disclosure.

FIG. 6 is a perspective view illustrating a heating apparatus 2 with a sheet holding plate 43 and a thermal expansion sheet S positioned thereon set forth in Embodiment 2 of the present disclosure.

FIG. 7 is a perspective view illustrating the heating apparatus 2 with the thermal expansion sheet S removed from the heating apparatus 2 set forth in Embodiment 2 of the present disclosure.

The heating apparatus 2 illustrated in FIGS. 6 and 7, is the same as the heating apparatus 1 illustrated in FIG. 1, except with the sheet holding plate 43 being positioned so as to come in contact with the upper surface peripheral edge of the thermal expansion sheet S. However, in the state illustrated in FIG. 7, the thermal expansion sheet S is removed from the heating apparatus 2. The sheet holding plate 43 has an opening in the center portion and presents a rectangular frame shape that does not overlap with the area in which a solid is formed on the thermal expansion sheet S.

As illustrated in FIG. 7 a hollow portion 41a is formed in the mounting table 41 beneath the thermal expansion sheet S. The hollow portion 41a is formed in the mounting table 41 in this manner because when the mounting table 41 comes in contact with the thermal expansion sheet S, heat escapes from the heat expansion sheet S to the mounting table 41 which inhibits foam expansion of the thermal expansion sheet S. However, the forming of the hollow portion 41a causes the thermal expansion sheet S, especially the center portion, to bend downward. Note that the hollow portion 41a may be a through-hole that passes through the mounting table 41 in a vertical direction, or may be a concave portion.

FIG. 8 is an explanatory diagram showing the bending of the thermal expansion sheet S.

In a case when the hollow portion 41a described above is provided beneath the thermal expansion sheet S, as illustrated in FIG. 8, the thermal expansion sheet S bends downward closer to the middle than the starting point (movement distance 0) and the ending point (movement distance d3) from the orientation in which the heater 10 moves along in the second direction.

Therefore, the distance between the heater 10 and the thermal expansion sheet S is greater at distance L2 in the middle of the thermal expansion sheet S than at distance L1 at the starting point and the ending point of the thermal expansion sheet S (L2>L1). Therefore, of the heating amount emitted from the heater 10, the heating amount received per unit time by the unit area of the thermal expansion sheet S is smaller in the middle of the thermal expansion sheet S than in the starting point and the ending point of the thermal expansion sheet S.

Therefore, it is preferable to make the heating amount received per unit time by the unit area of the thermal expansion sheet S close to uniform regardless of the position in the second direction by decreasing the movement speed of the heater 10 in the center portion of the thermal expansion sheet S thereby increasing the heating time of the center portion.

FIG. 9 is a table showing an example of speed correction values in Embodiment 2 of the present disclosure.

As illustrated in FIG. 9, in Embodiment 2 of the present disclosure, in each position in the second direction, compared to when the thermal expansion sheet S is not bent, that is to say, compared to the relative speed that is deemed appropriate in Embodiment 1, the movement speed of the heater 10 is decided in such a way that the movement speed of the heater 10 is slower by the speed correction value V2 in accordance with the movement distance of the heater 10.

In the example illustrated in FIG. 9, when the movement distance d illustrated in FIG. 8 of the heater 10 fulfills the relationship of $0 \leq d < d4$, or $d7 \leq d < d3$, the speed correction value V2 is 0. Also, when the movement distance d of the heater 10 fulfills the relationship of $d4 \leq d < d5$, or $d6 \leq d < d7$, the speed correction value V2 is V3. Also, when the movement distance d of the heater 10 fulfills the relationship of $d5 \leq d \leq d6$, the speed correction value V2 is V4. Here V4 is larger than V3, whereas V3 is larger than 0. Therefore, when the movement distance d of the heater 10 fulfills the relation of $d5 \leq d < d6$, the speed correction value (V4) becomes the largest, and accordingly the movement speed of the heater 10 becomes the slowest.

Figure 10:
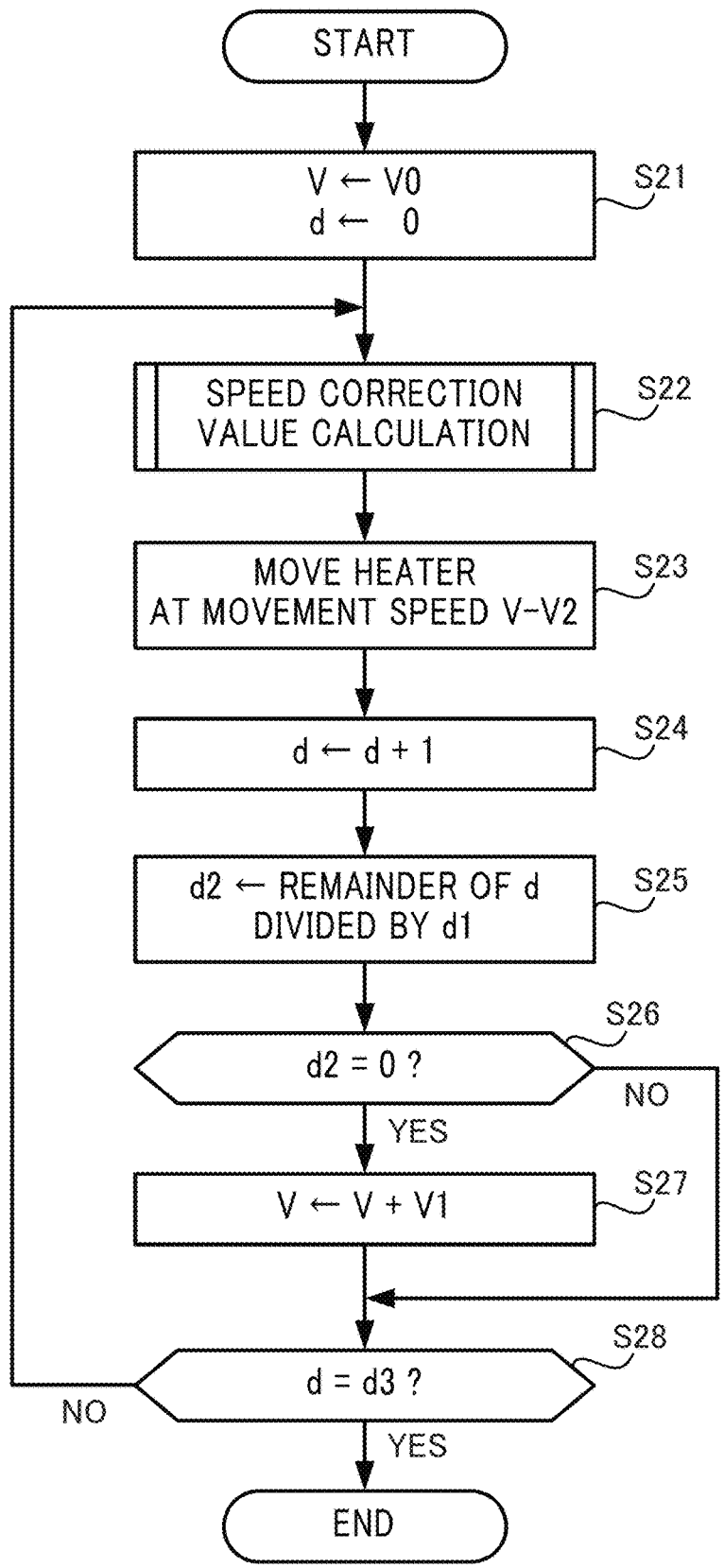
FIG. 10 is a flowchart showing the control process for movement speed of a heater in Embodiment 2 of the present disclosure.

FIG. 10 is a flowchart showing the control process for movement speed of the heater 10 in Embodiment 2 of the present disclosure.

In Embodiment 2 of the present disclosure, the steps S21 and S24-S28 are the same as steps S11 and S13-S17 of FIG. 4. Step S22 is a process not included in FIG. 4 and step S23 differs from step S12 illustrated in FIG. 4 in that the speed correction value V2 portion slows the movement speed V of the heater 10. The movement speed V is the relative speed deemed to be appropriate in Embodiment 1. Therefore, the explanation of the process illustrated in FIG. 10 is appropriately omitted.

First, the controller 30 sets initial value of the movement speed V of the heater 10 to the movement speed V0, and sets the movement distance counter d to 0 (step S21).

Figure 11:
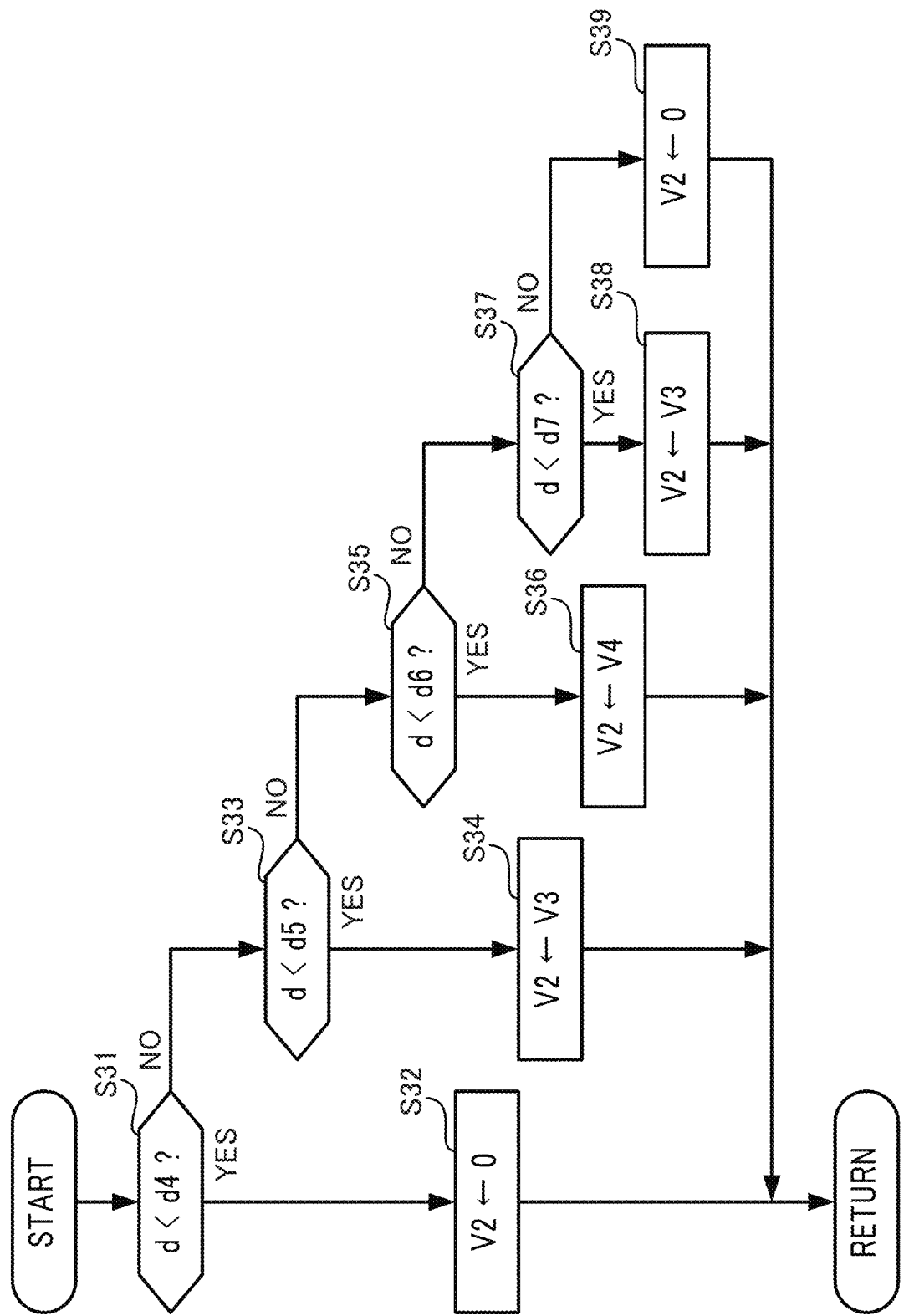
FIG. 11 is a flowchart showing the calculation process for speed correction values in Embodiment 2 of the present disclosure.

Next, the controller 30 calculates the speed correction value V2 according to the flowchart illustrated in FIG. 11 (step S22).

As illustrated in FIG. 11, if the movement distance d of the heater 10 is smaller than d4 (step S31; YES), the controller 30 determines that the speed correction value V2 is 0 (step S32).

Also, if the movement distance d of the heater 10 is not smaller than d4 (step S31; NO), yet is smaller than d5 (step S33; YES), the controller 30 determines that the speed correction value V2 is V3 (step S34).

Also, if the movement distance d of the heater 10 is not smaller than d5 (step S33; NO), yet is smaller than d6 (step S35; YES), the controller 30 determines that the speed correction value V2 is V4 (step S36).

Also, if the movement distance d of the heater 10 is not smaller than d6 (step S35; NO), yet is smaller than d7 (step S37; YES), the controller 30 determines that the speed correction value V2 is V3 (step S38).

Also, if the movement distance d of the heater 10 is not smaller than d7 (step S37; NO), the controller 30 determines that the speed correction value V2 is 0 (step S39).

Referring back to FIG. 10, the controller 30, based on the calculated speed correction value V2, causes the heater 10 to move at a speed obtained by subtracting the speed correction value V2 from the movement speed V (step S23).

Note that while it is acceptable for controller 30 to only allow processing so as to cause the heater 10 to move at the movement speed of V-V2 as described above, control is performed to gradually increase the movement speed of the heater 10 as described above in Embodiment 1 (step S27, etc.) also in Embodiment 2 of the present disclosure.

Next, the controller 30 increments the counter d by d+1 (step S24).

Also, when the distance at which the movement speed of the heater 10 changes (the distance at which there is a speed up in Embodiment 2 of the present disclosure) becomes d1, the controller 30 sets d2 to the remainder found by dividing counter d by d1 (step S25).

Also, when the d2 is 0 (step S26; YES), that is to say, when the heater 10 has advanced to distance d1, the controller 30 adds V1 to the movement speed V of the heater 10 (step S27). Note that V1 is the change amount in the movement speed of the heater 10.

Next, when the counter d reaches d3 indicating the end line of the thermal expansion sheet S (step S28; YES), the controller 30 stops the processing, and if not reached (step S28; NO) processing by the controller 30 returns to step S22.

Note that if d2 is not 0 in the aforementioned step S26 (step S26; NO), the controller 30 does not change the movement speed (step S27) and then advances to processing in the aforementioned step S28.

Due to the controller 30 performing the various kinds of processing illustrated in FIG. 10, control can be performed to keep the foaming height of the foaming of the foaming portion substantially uniform regardless of the position in the second direction even if the heater 10 or the thermal expansion sheet S, the mounting table 41, and/or the like accumulate heat and even if the thermal expansion sheet S experiences bending, as long as the black concentration level of the grayscale image in black ink of the foaming portion is the same. As described above, the controller 30 causes one of the speed of relative movement and the heat generation amount to change according to the distance between the heater 10 and the thermal expansion sheet S, and the position in the predetermined direction. The controller 30 may also cause one of the speed of the relative movement and the heat generation amount to change according to the distance between the heater 10 and the thermal expansion sheet S, and according to the elapsed time of the thermal energy emission directed at the thermal expansion sheet S by the heater 10.

Note that in Embodiment 2 of the present disclosure, according to the bending of the thermal expansion sheet S (distance between the thermal expansion sheet S and the heater 10), the controller 30 may, instead of controlling to adjust the speed of the relative movement between the heater 10 and the thermal expansion sheet S, perform control so as to cause the heat generation amount by the heater 10 to be greater when the heater 10 is in a position near the center of the thermal expansion sheet S in the second direction, than when the heater 10 is near the starting point and the ending point of the thermal expansion sheet S in the second direction. Alternatively, the controller 30 may perform control to cause both the movement speed of the heater 10 and the heat generation amount by the heater 10 to change.

As described above, the controller 30 performs one of: at the position in which the distance between the heater 10 and the thermal expansion sheet S becomes greater, reducing a change amount in the speed of the relative movement in comparison to when the distance is constant regardless of the position of the predetermined direction, and increasing the speed of the relative movement by the change amount, so as to change the speed of the relative movement according to the position in the predetermined direction; and at the position in which the distance between the heater 10 and the thermal expansion sheet S becomes greater, reducing a change amount in the heat generation amount in comparison to when the distance is constant regardless of the position of the predetermined direction, and decreasing the heat generation amount by the change amount, so as to change the heat generation amount according to the position in the predetermined direction. Alternatively, the controller 30 may perform one of: at a point in time in which the distance between the heater 10 and the thermal expansion sheet S becomes greater, reducing a change amount in the speed of the relative movement in comparison to when the distance is constant regardless of the position of the predetermined direction, and increasing the speed of the relative movement by the change amount, so as to change the speed of the relative movement according to the elapsed time of the thermal energy emission directed at the thermal expansion sheet S by the heater 10; and at a point in time in which the distance between the heater 10 and the thermal expansion sheet S becomes greater, reducing a change amount in the heat generation amount in comparison to when the distance is constant regardless of the position of the predetermined direction, and decreasing the heat generation amount by the change amount, so as to change the speed of the relative movement according to the elapsed time of the thermal energy emission directed at the thermal expansion sheet S by the heater 10.

For Embodiment 2 of the present disclosure described above, it is possible to obtain the same effect with respect to the same manner in aforementioned Embodiment 1, that is, the effect of being able to form a three-dimensional shape formed by heating the thermal expansion sheet S and causing foam expansion, with a high degree of accuracy.

Also, in Embodiment 2 of the present disclosure, the controller 30 performs control according a position in the second direction, so as to cause at least one of: the relative movement speed of the heater 10, and the heat generation amount of the heater 10 to change according to a position in the second direction based on the distance between the heater 10 and the thermal expansion sheet S. Accordingly, even when there is deformation in the thermal expansion sheet S, for example, bending of the thermal expansion sheet S, as long as the black concentration level of the grayscale image in black ink of the foaming portion is the same, the controller 30 can perform control so as to keep the foaming height of the foaming portion substantially uniform regardless of the position in the second direction.

Embodiment 3

Figure 12:
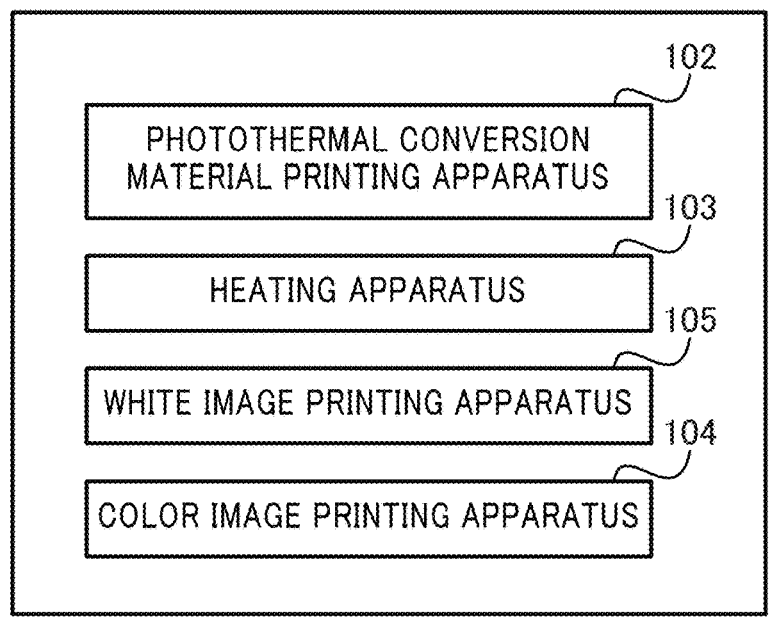
FIG. 12 is a block diagram of a three-dimensional object forming system set forth in Embodiment 3 of the present disclosure.

FIG. 12 is a block diagram of a three-dimensional object forming system 101 set forth in Embodiment 3 of the present disclosure.

As illustrated in FIG. 12, the three-dimensional object forming system 101, includes a photothermal conversion material printing apparatus 102 that prints, by inkjet method, black ink used as photothermal conversion material based on grayscale image data prepared in advance, onto the thermal expansion sheet S, a heating apparatus 103 for thermally expanding the thermal expansion sheet S, a white image printing apparatus 105 that prints, by inkjet method, a white image using white ink based on white image data prepared in advance, so as to cover at least the grayscale image of the thermal expansion sheet S, and a color image printing apparatus 104 that prints, by inkjet method, a color image using color ink based on color image data prepared in advance, onto the grayscale image or the white image of the thermal expansion sheet S. Note that the photothermal conversion material printing apparatus 102 is one example of a photothermal conversion material printing apparatus that prints a grayscale image in the area of the thermal expansion sheet S that ought to be foam expanded.

Note that the three-dimensional object forming system in Embodiment 3 of the present disclosure may include the photothermal conversion material printing apparatus 102 and heating apparatus 1 set forth in aforementioned Embodiment 1, or the photothermal conversion material printing apparatus 102 and heating apparatus 2 set forth in aforementioned Embodiment 2. Also, the three-dimensional object forming system in Embodiment 3 may further include the white image printing apparatus 105 and/or the color image printing apparatus 104 in addition to the photothermal conversion material printing apparatus 102 and the heating apparatus 1 or the heating apparatus 2.

Here, in the grayscale image data, as described above, when forming a three-dimensional object that corresponds to a raw image, the portion that ought to be relatively highly formed is set to have a high concentration level value whereas the portion that ought to be relatively lowly formed is set to have a low concentration level. The white image data refers to data that includes a concentration level value of the white image to be formed to lie between the grayscale image and the color image in order to improve the appearance of the color image formed on the surface layer side of the grayscale image S3. The white image data may, for example, be set at that concentration level, so as to be formed to cover the grayscale image S3. The color data refers to data that contains the concentration level value of the color image to be further formed after the white image is formed. In order to form the desired color image, the color image data, for example, contains each value corresponding to the concentrations levels at which each of the ink colors, cyan C, magenta M, and yellow Y should be formed.

Since the heating apparatus 103 is the same as the heating apparatus 1 set forth in aforementioned Embodiment 1 and the heating apparatus 2 set forth in aforementioned Embodiment 2, the description is omitted. As one example, a halogen lamp 127a of 900 W is used and is placed in a position 4 cm apart from the surface of the thermal expansion sheet S conveyed on a medium conveyance route 125. The conveyance speed of the thermal expansion sheet S conveyed by the conveyance roller is 20 mm/sec. Under these conditions, the thermal expansion sheet S is heated to a temperature between 100° C. and 110° C. thereby causing the grayscale printing portion of the thermal expansion sheet S to thermally expand.

Although described in detail later, after the grayscale image printing portion is thermally expanded and risen by the heating apparatus 103, thermal expansion sheet S is carried to the white image printing apparatus 105 where the white image is printed, and then is carried to the color image printing apparatus 104 where the color image is printed.

Figure 13:
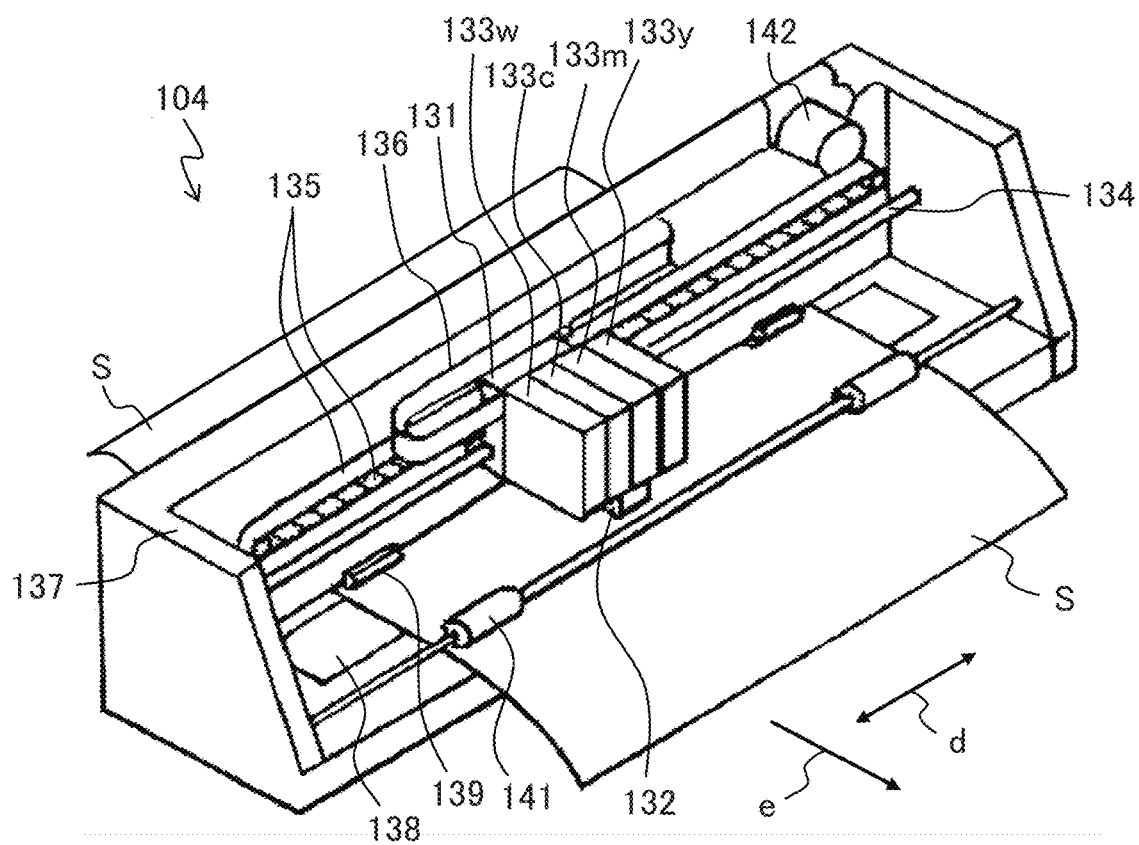
FIG. 13 is a perspective diagram illustrating a structure of an ink jet printer in Embodiment 3 of the present disclosure.

FIG. 13 is a perspective diagram illustrating a structure of the photothermal conversion material printing apparatus 102, the white image printing apparatus 105, and the color image printing apparatus 104 in Embodiment 3 of the present disclosure.

The photothermal conversion material printing apparatus 102, the white image printing apparatus 105, and the color image printing apparatus 104 include a carriage 131 that is arranged to be reciprocatable in the directions indicated by two-way arrow d, orthogonal to the paper conveyance direction. A print head 132 that executes printing and ink cartridges 133 that hold ink are attached to the carriage 131. The photothermal conversion material printing apparatus 102 at least contains a cartridge that holds black K ink, the white image printing apparatus 105 at least contains a cartridge that holds white W ink, and color image printing apparatus 104 at least contains cartridges that hold cyan C, magenta M, and yellow Y ink.

Also, one part of the carriage 131 is slideably supported by a guiderail 134, and another part of the carriage 131 is fastened to a toothed drive belt 135. Accordingly the print head 132 and the ink cartridges 133 are reciprocatively driven in together with carriage 131 in the directions, indicated by the two-way arrow d in FIG. 13, orthogonal to the paper conveyance direction, that is, the main scanning direction of printing.

The print head 132 and a control device (described later), of the three-dimensional object forming system 101, are connected by a flexible communication cable 136 passing through an internal frame 137 therebetween. Printing data and control signals are sent from the control device via the flexible communication cable 136 to the print head 132.

Also, a platen 138 that makes up part of the paper conveyance path on the lower end portion of the internal frame 137 is arranged so as to face the print head 132 and extend in the above-mentioned main scanning direction of the print head 132. Also, the thermal expansion sheet S that comes in contact with platen 138 is intermittently conveyed by a paper feed roller pair 139 (the bottom roller is not visible in FIG. 13 because it is hidden by the thermal expansion sheet S) and the paper eject roller pair 141 (the bottom roller also is not visible) in the print sub scanning direction indicated by arrow e in the diagram. Note that the paper feed roller pair 139 and the paper eject roller pair 141 are not required to have top rollers as long as the thermal expansion sheet S is conveyable.

In the case of intermittently conveying the thermal expansion sheet S, while conveyance is stopped, the print head 132, in an adjacent state with thermal expansion sheet S, jets ink droplets onto the sheet surface while being driven via the toothed drive belt 135 and the carriage 131 by a motor 142. Printing is performed is this way along the entire surface of the thermal expansion sheet S through repetition of intermittent conveyance of the thermal expansion sheet S and printing (printing) as the print head 132 reciprocatively moves.

The photothermal conversion material printing apparatus 102 prints, by inkjet method, black ink used as photothermal conversion material based on grayscale image data prepared in advance, onto the thermal expansion sheet S. Next, the heating apparatus 103 causes the thermal expansion sheet S to thermally expand. Thereafter, the white image printing apparatus 105 prints, by inkjet method, a white image using white ink based on white image data prepared in advance, so as to cover at least the grayscale image of the thermal expansion sheet S. In doing so, the color appearance can be further improved in comparison with the case of direct printing in which coloring is performed directly on top of the black ink. Next, the color image printing apparatus 104 prints, by inkjet method, a color image using color ink based on color image data prepared in advance, onto the grayscale image or the white image of the thermal expansion sheet S. The movement between each apparatus may be performed automatically by a belt conveyer or manually by a worker.

Figure 14:
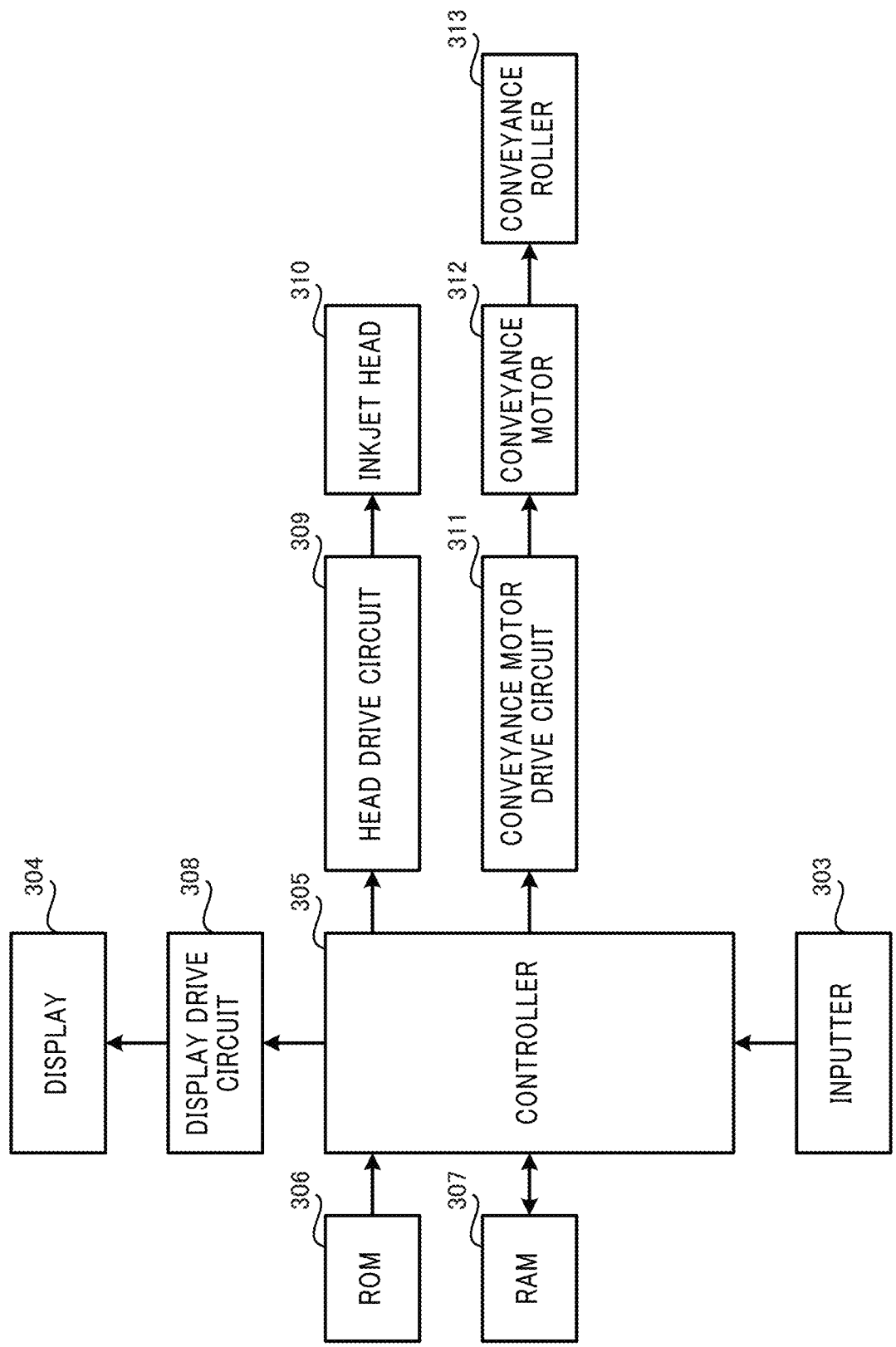
FIG. 14 is a circuit block diagram including a control device of a three-dimensional object forming system set forth in Embodiment 3 of the present disclosure.

FIG. 14 is a control block diagram of a three-dimensional object forming system 101 that includes the photothermal conversion material printing apparatus 102, the white image printing apparatus 105, and the color image printing apparatus 104 set forth in Embodiment 3 of the present disclosure. As illustrated in FIG. 14, the photothermal conversion material printing apparatus 102, the white image printing apparatus 105, and the color image printing apparatus 104 include an inputter 303, a display 304, a controller 305, a read-only memory (ROM) 306, a random access memory (RAM) 307, a display drive circuit 308, a head drive circuit 309, an inkjet head 310 which is one example of an ink ejector, a conveyance motor drive circuit 311, a conveyance motor 312, and a conveyance roller 313.

Note that the photothermal conversion material printing apparatus 102, the white image printing apparatus 105, and the color image printing apparatus 104 form a desired three-dimensional shape on, for example, a thermal expansion sheet S, by causing the thermal expansion sheet S to thermal expand using the heating apparatus 103, based on image data.

The controller 305, for example, is a central processing unit (CPU) that controls operations of the respective parts of the circuit according to the key operation signal from the inputter 303, or by automatically starting the system program that is previously stored in the ROM 306, the control program stored on a memory card, the control program read from an external device, and/or the like, using RAM 307 as working memory.

The inputter 303, the ROM 306, the RAM 307, the display drive circuit 308 that drives the display 304, the head drive circuit 309 that drives the inkjet head 310, and the conveyance motor drive circuit 311 that drives the conveyance motor 312 so as to drive the conveyance roller 313, are connected to the controller 305.

The ROM 306 stores a program and the like to cause the inkjet head 310, by the head drive circuit 309, to print a desired image onto the thermal expansion sheet S. The ROM 306 also functions as a recording medium stored with a program readable by the controller 305.

The RAM 307 functions as input data memory that stores desired image data to be printed. In addition to functioning as print data memory that stores input image data, the RAM 307 also functions as display data memory, and the like that stores pattern data for displaying a desired image on the display 304. The RAM 307 includes a register, a counter, and the like, that temporarily store data required for print processing and the like.

The head drive circuit 309 controls the inkjet head 310 based on image data stored in the RAM 307. The inkjet head 310 prints a desired image onto the thermal expansion sheet S by ejecting ink according to the control.

By controlling the stepper motor based on image data stored on the RAM 307, the conveyance motor drive circuit 311 controls the conveyance roller 313 and causes, while printing onto the thermal expansion sheet S by the inkjet head 310 is underway, the thermal expansion sheet S to be conveyed at a desired speed.

Figure 15:
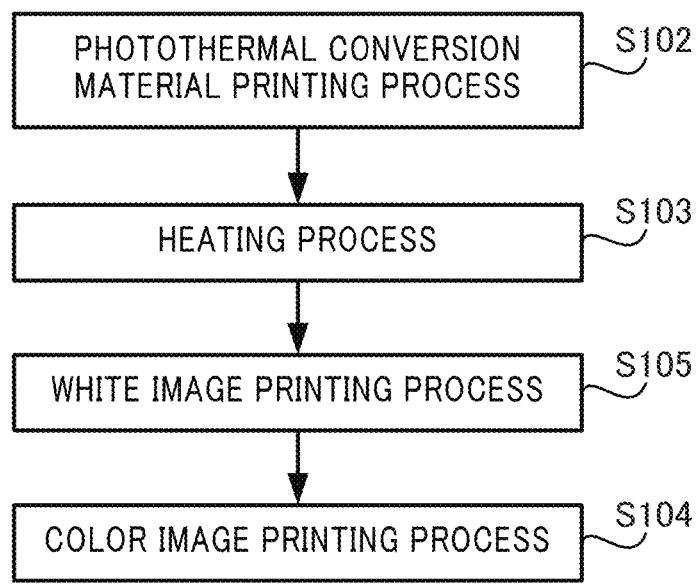
FIG. 15 is a flowchart of a three-dimensional object forming method set forth in Embodiment 3 of the present disclosure.
Figure 16:
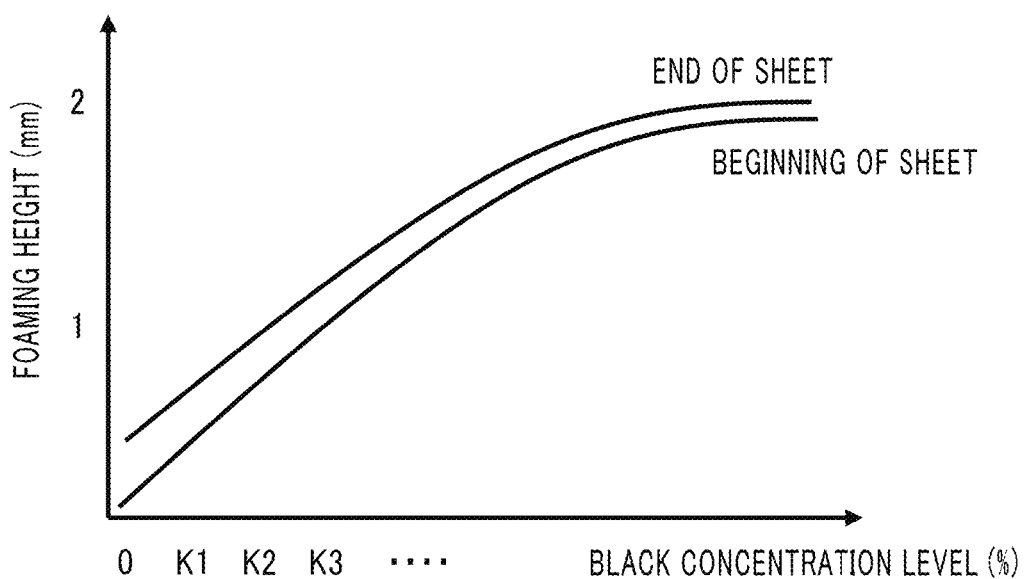
FIG. 16 is a graph illustrating the foaming height of a thermal expansion sheet in the case of heat accumulation occurring in a lamp unit.

Next, three-dimensional object form processing utilizing the three-dimensional object forming system 101 in Embodiment 3 of the present disclosure based on the three-dimensional object forming method set forth in Embodiment 3 of the present disclosure shown in FIG. 15 is described. First, the above-mentioned grayscale image S3 is formed on the face of the foaming resin layer S2 of the thermal expansion sheet S by the photothermal conversion material printing apparatus 102 (step S102). Next, thermal expansion sheet S, on which the grayscale image S3 is formed, is carried to the heating apparatus 103 where the heat processing is conducted (step S103). Thus, the thermal expansion sheet S is obtainable that has the foaming resin layer S2 foam expanded thereupon according to the concentration level of the grayscale image S3. Next, the thermal expansion sheet S that has the foaming resin layer S2 foam expanded thereupon is carried to the white image printing apparatus 105 and a white image is printed (step S105). Next, the thermal expansion sheet S printed with the white image is carried to the color image printing apparatus 104 and a color image is printed (step S104). As above, a three-dimensional image can be formed having a desired unevenness and a desired color image printed thereupon.

For Embodiment 3 of the present disclosure described above, it is possible to obtain the same effect with respect to the same manner in aforementioned Embodiment 1 and 2, that is, the effect of being able to form a three-dimensional shape formed by heating the thermal expansion sheet S and causing foam expansion, with a high degree of accuracy.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A heating apparatus, comprising:
    an emitter that emits light to a thermal expansion sheet that expands according to a heating amount absorbed, the light being converted into heat by the thermal expansion sheet;
    a mounting table on which the thermal expansion sheet is mounted, and in which a hollow portion is provided, the hollow portion being provided at a position such that a portion of the thermal expansion sheet, when mounted on the mounting table, overlaps with the hollow portion and bends downward;
    a relative mover that causes, when the thermal expansion sheet is mounted on the mounting table, relative movement between the emitter and the thermal expansion sheet such that the emitter relatively moves along the portion of the thermal expansion sheet, the relative mover causing the thermal expansion sheet to move relative to the emitter in a predetermined direction or causing the emitter to move relative to the thermal expansion sheet in the predetermined direction; and
    a computer programmed to gradually change a speed of the relative movement by the relative mover when the relative mover causes the relative movement between the emitter and the thermal expansion sheet while the light is being emitted by the emitter, such that (i) the speed of the relative movement gradually and linearly increases according to an elapsed time from a start of light emission by the emitter, and (ii) a speed correction value is subtracted from the speed of the relative movement, the speed correction value being larger as a position of the emitter is closer to a center of the portion of the thermal expansion sheet.

2. The heating apparatus according to claim 1, wherein:
    the thermal expansion sheet includes a conversion layer that converts the light emitted by the emitter into heat, the conversion layer being provided on a surface of the thermal expansion sheet; and
    the emitter emits the light to the surface of the thermal expansion sheet on which the conversion layer is provided.

3. The heating apparatus according to claim 1, further comprising a sheet holding plate that holds the thermal expansion sheet on a periphery of the hollow portion.

* * * * *